United States Patent [19]

Lizell

[11] Patent Number: 5,163,659
[45] Date of Patent: Nov. 17, 1992

[54] HYDRAULIC ACTUATOR FOR LEVELING SYSTEM

[75] Inventor: Magnus B. Lizell, Danderyd, Sweden

[73] Assignee: Monroe Auto Equipment Company, Monroe, Mich.

[21] Appl. No.: 625,947

[22] Filed: Dec. 11, 1990

[51] Int. Cl.$^5$ .................. B60G 17/00; B60G 17/015
[52] U.S. Cl. .................. 267/64.16; 267/64.17; 267/DIG. 2
[58] Field of Search .................. 267/DIG. 1, DIG. 2, 267/64.16, 64.17

[56] References Cited

U.S. PATENT DOCUMENTS

| | | | |
|---|---|---|---|
| 3,799,528 | 3/1974 | Allinquant et al. | 267/64.17 |
| 4,105,194 | 8/1978 | Smeltzer et al. | 267/DIG. 2 |
| 4,200,269 | 4/1980 | Ludwig | 267/DIG. 2 |
| 4,593,658 | 6/1986 | Moloney | 123/90.11 |
| 4,726,741 | 2/1988 | Cusack | 417/322 |

Primary Examiner—Joseph F. Peters, Jr.
Assistant Examiner—Anne E. Bidwell
Attorney, Agent, or Firm—Harness, Dickey & Pierce

[57] ABSTRACT

A hydraulic actuator including a pressure cylinder forming a working chamber having first and second portions operable to store damping fluid. The hydraulic actuator further includes a piston disposed within the pressure cylinder between the first and second portions of the working chamber, and a piston rod for supporting the piston in the pressure cylinder. In addition, the hydraulic actuator includes a reservoir for storing damping fluid as well as a pump at least partially disposed within the hydraulic actuator for pumping damping fluid from the reservoir to the working chamber.

32 Claims, 3 Drawing Sheets

HYDRAULIC ACTUATOR FOR LEVELING SYSTEM

BACKGROUND OF THE INVENTION

1. Field of the Invention

This invention relates to vehicle suspension systems, and more particularly to a hydraulic actuator for a leveling system of a motor vehicle.

2. Description of Related Art

In recent years, substantial interest has grown in motor vehicle suspension systems which can offer improved comfort and road holding over the performance offered by conventional passive suspension systems. In general, such improvements are achieved by utilization of an "intelligent" suspension system capable of electronically controlling the suspension forces generated by hydraulic actuators provided at each corner of the motor vehicle.

Suspension systems are provided to filter or "isolate" the vehicle body from vertical road surface irregularities as well as to control body and wheel motion. In addition, it is desirable that the suspension system maintain an average vehicle attitude to promote improved platform stability during maneuvering. The classic passive suspension system includes a spring and a damping device in parallel which are located between the sprung mass (vehicle body) and the unsprung mass (wheel and axles).

Hydraulic actuators, such as shock absorbers and/or struts, are used in conjunction with convention passive suspension systems to absorb unwanted vibration which occurs during driving. To absorb this unwanted vibration, the hydraulic actuators often include a piston which is located within the actuator and is connected to the body of the automobile through a piston rod. Because the piston is able to limit the flow of damping fluid within the working chamber of the actuator when the actuator is telescopically displaced, the actuator is able to produce a damping force which counteracts the vibration which would otherwise be directly transmitted from the suspension to the vehicle body. The greater the degree to which the flow of damping fluid within the working chamber is restricted by the piston, the greater the damping forces which are generated by the actuator.

It is often desirable to have a leveling system which is associated with a shock absorber. Such leveling systems are used to change the height of the shock absorber, rather than to adjust the manner in which road vibration is transferred to the sprung portion of the automobile. In this regard, leveling systems are used to compensate for weight changes associated with the shock absorber which are the result of changes in two types of loading: static loading and dynamic loading. Static loading is simply the static load which is due to the weight associated with the passengers of the automobile, the weight of the cargo in the automobile, and so forth. In contrast, dynamic loading involves the loading which normally varies according to different types of road conditions.

Leveling systems of the type described above may be of varying construction. For example, U.S. Pat. No. 4,141,572 discloses a vehicle leveling system in which sensors are located in a pressurizable chamber and are used to sense the relative position of two movable members which are connected to the sprung and unsprung portion of the automobile, respectively. When the sensors indicate that the movable members are oriented proximate to one position which occurs when the shock absorber is very compressed, air of a relatively high pressure is delivered to the pressurizable chamber causing the shock absorber to elongate. When the sensors indicate that the movable members are oriented proximate to a second position which occurs when the shock absorber is overly extended, air is released from the pressurizable chamber so as to cause the shock absorber to contract.

Another type of vehicle leveling system is described in Lizell, M., "Dynamic Leveling for Ground Vehicles", Doctorial Thesis, Royal Institute of Technology, Stockholm, Sweden. In this reference, a dynamic leveling system for an automobile is described in which the actuator has both variable passive damping capability as well as leveling capability. Using this arrangement, the power consumption of the suspension system is relatively low.

Leveling systems of the type described above generally require the use of a pump for delivering relatively high pressure fluid to the hydraulic actuator. Because these systems have a single pump which delivers damping fluid to each of the shock absorbers, they often have one particular disadvantage. The use of a single pump often requires a fairly extensive hydraulic system which adds both cost and complexity to the leveling system.

SUMMARY OF THE INVENTION

Accordingly, it is a primary object of the present invention to provide a hydraulic actuator for a leveling system of a motor vehicle which is able to adjust the flow of damping fluid between a reservoir and the working chamber of the hydraulic actuator.

Another object of the present invention is to provide a hydraulic actuator for a leveling system which is operable to change the attitude of a vehicle through a controlled adjustment of the suspension damping force so as to compensate for vehicle body height variation.

A further object of the present invention is to provide a hydraulic actuator for a leveling system which reduces the need for components which are required to supply damping fluid from a reservoir of damping fluid to the working chamber of the hydraulic actuator.

Another object of the present invention is to provide a hydraulic actuator for leveling system which permits the leveling system to be relatively low in cost and simple in construction.

Yet another object of the present invention is to provide a hydraulic actuator for a leveling system which independently adjusts the vehicle height for each corner of a motor vehicle by selectively controlling the fluid pressure and flow between the upper and lower portions of a working chamber of the hydraulic actuator.

BRIEF DESCRIPTION OF THE DRAWINGS

Various advantages of the present invention will become apparent to one skilled in the art upon reading the following specification and by reference to the following drawings in which.

DESCRIPTION OF THE PREFERRED EMBODIMENT

Figure 1:
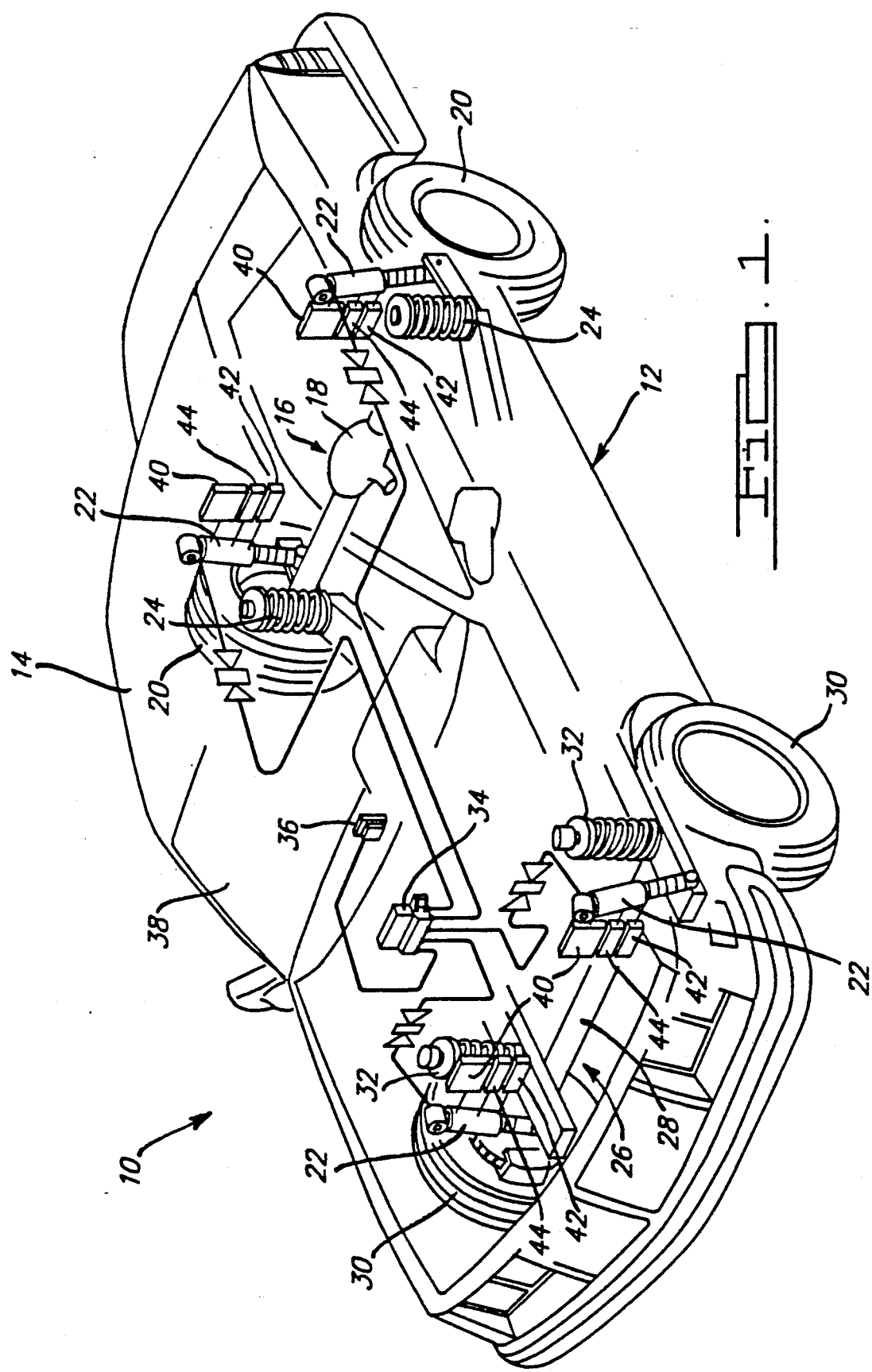
FIG. 1 illustrates a leveling system according to the teachings of the present invention shown in operative association with a typical motor vehicle.

Referring to FIG. 1, a leveling system 10 in accordance with the present invention is shown. The leveling system 10 is depicted in operative association with a conventional automobile 12 having vehicle body 14. Automobile 12 includes a rear suspension 16 having a transversely extending rear axle assembly 18 adapted to support rear wheels 20. Rear axle assembly 18 is operably connected to automobile 12 by means of a pair of hydraulic actuators 22 as well as by helical coil springs 24. Similarly, automobile 12 has a front suspension system 26 including a transversely extending front axle assembly 28 adapted to support front wheels 30. Front axle assembly 28 is connected to automobile 12 by means of a second pair of hydraulic actuators 22 and by a second pair of helical coil springs 32. While automobile 12 has been depicted as a passenger car, the leveling system 10 may be used with other types of motor vehicles as well. Furthermore, the structural association of the front and rear axle assemblies are exemplary in nature and are not intended to limit the scope of the present invention.

For controlling the camping and leveling characteristics of hydraulic actuators 22, a central electronic control module 34 and a visual screen 36 are provided. The visual 36 provides the occupant with a visual readout display of the dynamic control parameters and characteristics of leveling system 10. Electronic control module 34 receives output from various sensors for generating control signals for selectively controlling the damping (dissipative) and dynamic leveling (power addition) characteristics of hydraulic actuators 22. In fluid communication with each actuator 22 is an accumulator 40 and an outlet valve such as servo flow control valve 42. Servo valves 42 are in fluid communication with a damping fluid reservoir tank 44. The reservoir tank 44 is also directly connected to each of the hydraulic actuators 22 and is used to receive and supply damping fluid to the hydraulic actuators 22 in the manner described below.

Figure 2:
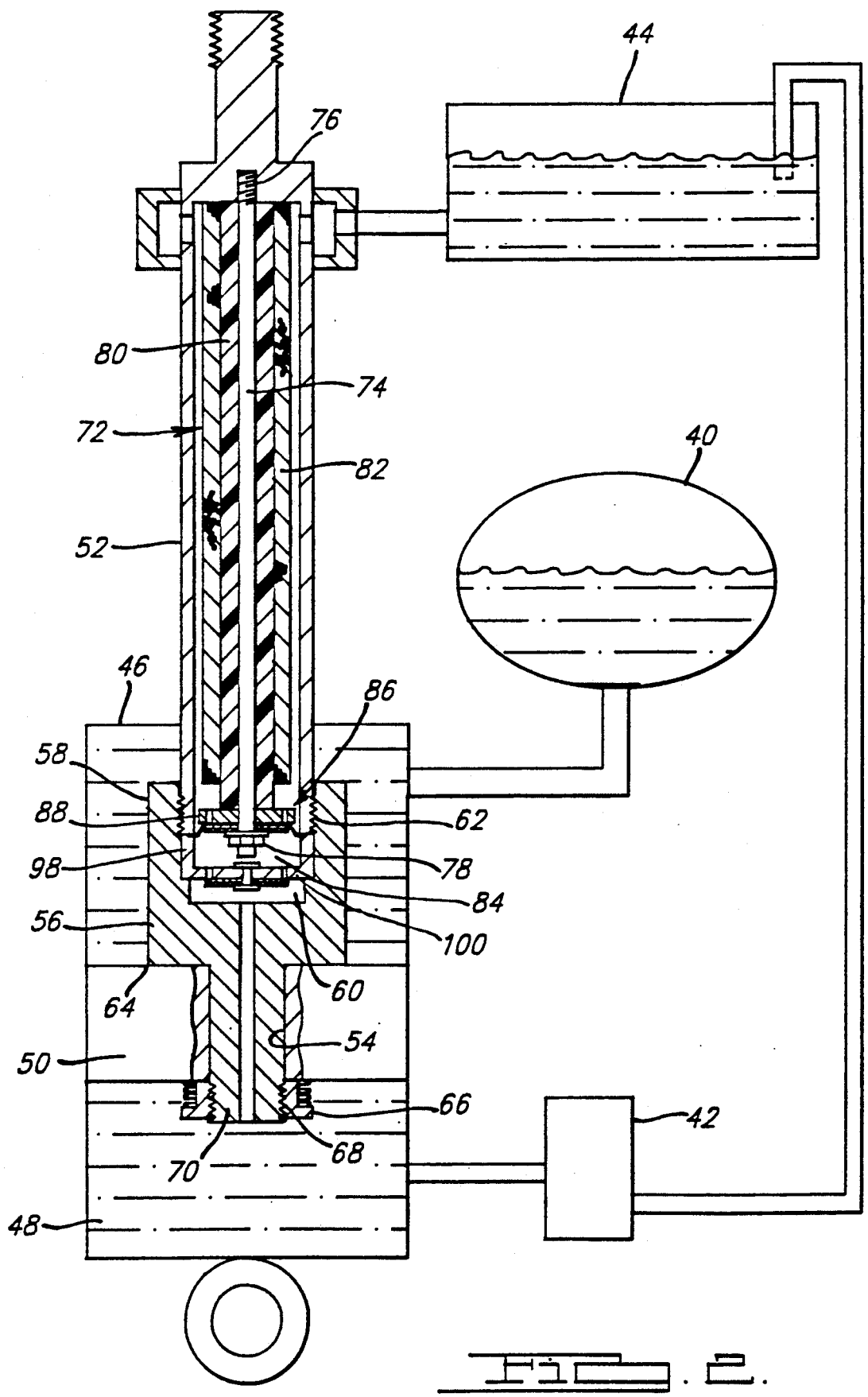
FIG. 2 is a schematic representation of the hydraulic actuator for use in the leveling system according to the preferred embodiment of the present invention as shown in FIG. 1.

With particular reference to FIG. 2, the hydraulic actuator 22 according to the preferred embodiment of the present invention is shown. The hydraulic actuator 22 comprises an elongated tubular pressure cylinder 46 defining a damping fluid containing working chamber 48. Disposed within the working chamber 48 is a reciprocable piston 50 which is secured to one end of an axially extending piston rod 52 in the manner described below.

Those skilled in the art will appreciate that, upon reciprocal movement of the piston 50, damping fluid within the pressure cylinder 46 is transferred between the upper and lower portions of the working chamber 48. By controlling the flow of damping fluid between the upper and lower portion of the working chamber 48, the hydraulic actuator 22 is able to controllably dampen relative movement between the body and the suspension of the automobile 12 so as to optimize both ride comfort and road handling ability. The construction and operation of the piston 50 may be of the type shown and described in U.S. Ser. No. 07/322,774 filed Mar. 13, 1989, which is hereby incorporated by reference. However, other suitable pistons may also be used.

To support the piston 50 within the pressure cylinder 46, the piston 50 has a central bore 54 operable to receive an axially extending piston post 56. The piston post 56 has an upper portion 58 with an internally threaded central bore 60 adapted to threadably engage an externally threaded lower end portion 62 of the piston rod 52. The piston post 56 further includes a radially extending step 64 having an outside diameter greater than the diameter of the central bore 54. Because the step 64 is disposed above the piston 50, the step 64 limits upward movement of the piston 50 relative to the piston post 56. In addition, a piston retaining nut 66 is provided having an internally threaded bore 68 which threadably engages an externally threaded lower portion 70 of the piston post 56 at a position below the piston 50. Because the outside diameter of the piston retaining nut 66 is greater than the diameter of the central bore 54 of the piston 50, the piston retaining nut 66 prevents downward movement of the piston 50 relative to the piston post 56.

To provide means for pumping damping fluid from the reservoir to the first and second portions of the working chamber 48 during vehicle leveling adjustment, a longitudinal pump member 72 is provided. The longitudinal pump member 72 is disposed within the piston rod 52 and extends from the upper internal portion of the piston rod 52 to a position proximate the lower portion of the piston rod 52. To support the longitudinal pump member 72 within the piston rod 52, a support rod 74 is provided. The support rod 74 has an upper portion 76 which threadably engages the upper internal portion of the piston rod 52. In addition, the support rod 74 has a head portion 78 at its lower end which facilitates rotation of the support rod 74. Because the support rod 74 extends through the center of the longitudinal pump member 72, rotation of the head portion 78 causes the threaded upper portion 76 of the support rod 74 to engage the upper internal portion of the piston rod 52 so as to secure the support rod 74, and hence the longitudinal pump member 72, in the piston rod 52. Furthermore, rotation of the head portion 78 of the pump member 72 causes a compressive load to be exerted on a magnetostrictive sleeve described below.

To provide means for elongating and contracting the longitudinal pump member 72, the longitudinal pump member 72 further includes a magnetostrictive sleeve 80. The magnetostrictive sleeve 80 is also located within the piston rod 52 and is disposed around the external periphery of the support rod 74. The magnetostrictive sleeve 80 extends from a position adjacent to the upper internal portion of the piston rod 52 in a downward direction to a position near the head portion 78 of the support rod 74. Accordingly, the upper internal portion of the piston rod 52 and the head portion of the support rod 74 are able to exert compressive force on the magnetostrictive sleeve 80. While the magnetostrictive sleeve 80 may be made from Terfenol, other suitable materials may be used.

To cause the magnetostrictive sleeve 80 to elongate in response to an electromagnetic field, an electrical coil 82 is provided within the longitudinal pump member 72. The electrical coil 82 is disposed around the external periphery of the magnetostrictive sleeve 80 and extends from the position adjacent the upper internal portion of the piston rod 52 in a downward direction proximate to the lower portion of the magnetostrictive sleeve 80. As will be evident to those skilled in the art, the application of current to the coil 82 causes an electromagnetic field to be generated in the magnetostrictive sleeve 80. The presence of this electromagnetic field in the magnetostrictive sleeve 80 causes the magnetostrictive sleeve 80 to elongate. When the electrical current is removed, the strength of the electromagnetic field within the magnetostrictive sleeve declines thereby causing the length of the magnetostrictive sleeve 80 to decrease to its original length.

To provide means for controlling the flow of damping fluid from the reservoir tank 44 to an intermediate chamber 84 disposed between the piston rod and the piston post at a position below the head portion 78 of the support rod 74, a first valve member 86 is provided. The first valve member 86 includes a first circular plate member 88 which is radially disposed at the lower portion of the piston rod 52. In this regard, the upper surface of the first plate member 88 engages the lower end of the magnetostrictive sleeve 80 so as to prevent upward movement of the first plate member 88. Furthermore, the head portion 78 of the support rod 74 is sufficiently larger in diameter than the aperture in the plate member 88 through which the support rod 74 passes so as to prevent downward movement of the plate member 88.

The diameter of the first plate member 88 is such that the first plate member 88 does not engage the inside surface of the piston rod 52, though it is to be understood that this need not be so if the first valve member 86 is of other construction. In addition, the first plate member 88 includes a first plurality of flow passages 90 disposed between the upper and lower surfaces of the first plate member 88 which allow damping fluid to flow from the reservoir tank 44 to the intermediate chamber 84 below the first plate member 88 in the manner described below.

To provide unidirectional flow of damping fluid through the first plurality of flow passages 90, the first valve member 86 further comprises a first plurality of disk members 92 as well as a membrane 94. The membrane 94 is located adjacent to the lower surface of the first plate member 88, while the periphery of the membrane 94 is secured to lower portion of the piston rod 52 by means of the second plate member described below. The first plurality of disk members 92 are disposed between the lower surface of the membrane 94 and the upper surface of the head portion 78 of the support rod 74. The membrane 94 has a plurality of apertures 96 which allow damping fluid flowing through the first plurality of flow passages 90 to flow through the membrane 94 to the intermediate chamber 84 which is located below the first plate member 88.

While the first plurality of disk members 92 biases the membrane 94 against the first plate member 88 which prevents the flow of damping fluid through the apertures 96 in the membrane 94, when the pressure of damping fluid in the reservoir tank 44 exceeds that of the damping fluid in the intermediate chamber 84 by a predetermined amount, the periphery of each disk member in the first plurality of disk members 92 is bent in a downward direction (see FIG. 3) so as to allow damping fluid to flow into the intermediate chamber 84 through the first plurality of flow passages 90 and the apertures 96. However, damping fluid is unable to flow from the intermediate chamber 84 to the reservoir tank 44 through the first plurality of flow passages 90 since the first plurality of disk members 92 keep the flow passages 90 closed to flow in this direction.

To provide means for controlling the flow of damping fluid from the intermediate chamber 84 to the working chamber 48 of the hydraulic actuator 22, a second valve member 98 is provided. The second valve member 98 includes a second circular plate member 100 which is disposed within the central bore 60 of the piston post 56 at a position below the first valve member 86. The outer periphery of the second plate member 100 has an upwardly extending flange portion 102. The upper portion 104 of the flange portion 102 is able to be secured against the outer periphery of the membrane 94 which in turn secures the membrane 94 between the second plate member 100 and the lower end of the piston rod 52. Furthermore, the lower portion 106 of the flange portion 102 engages a step 108 on the piston post 56 so as to prevent downward movement of the second plate member 100.

To allow damping fluid in the intermediate chamber 84 to flow into the working chamber 48, the second plate member 100 has a second plurality of flow passages 110 which extend from the intermediate chamber 84 to the lower portion 112 of the central bore 60 which fluidly communicates with lower portion of the working chamber 48. On the lower surface of the second plate member 100 is a second plurality of disk members 114. The second plurality of disk members 114 are operable to allow damping fluid to flow through the second plurality of flow passages 110 when the pressure in the intermediate chamber 84 exceeds the pressure of damping fluid in the lower portion of the working chamber 48 by a predetermined amount. However, the second plurality of disk members 114 prevent the flow of damping fluid through the second plurality of flow passages 110 when the pressure of damping fluid in the lower portion 112 of the central bore 54 exceeds that of the damping fluid in the intermediate chamber 84.

The second valve member 98 further comprises a securing pin 116 disposed in the center of the second plate member 100. The securing pin 116 has an enlarged upper head portion 118 and enlarged lower head portion 120. The enlarged upper head portion 118 of the securing pin 116 is disposed on the upper surface of the second plate member 100 and prevents downward movement of the securing pin 116 with respect to the second plate member 100. The lower enlarged head portion 120 is disposed immediately below the second plurality of disk members 114 and prevents downward movement of the second plurality disk members 114 with respect to the second plate member 100.

The operation of the hydraulic actuator 22 will now be described with reference to FIGS. 3 and 4. During the first portion of the pumping cycle as shown in FIG. 4, current is delivered to the coil 82 causing an electromagnetic field to be generated in the magnetostrictive sleeve 80 of such a magnitude so as to result in the elongation of the magnetostrictive sleeve 80. This elongation of the magnetostrictive sleeve 80 causes the longitudinal pump member 72 to elongate, thereby moving the first valve member 86 in a downward direction. This downward movement of the first valve member 86 causes the pressure inside the intermediate chamber 84 to increase which in turn causes the second plurality of disk members 114 to deflect in a downward direction. This downward deflection of the second plurality of disk members 114 causes damping fluid to flow from the intermediate chamber 84 through the second plurality of flow passages 10 in the second plate member 100 into the lower portion 112 of the central bore 54 of the piston post 56. Since the damping fluid in the lower portion 112 of the central bore 54 fluidly communicates with the lower portion of the working chamber 48, the damping fluid flowing through the second plurality of flow passages 110 is able to enter a lower portion on the working chamber 48.

Figure 3:
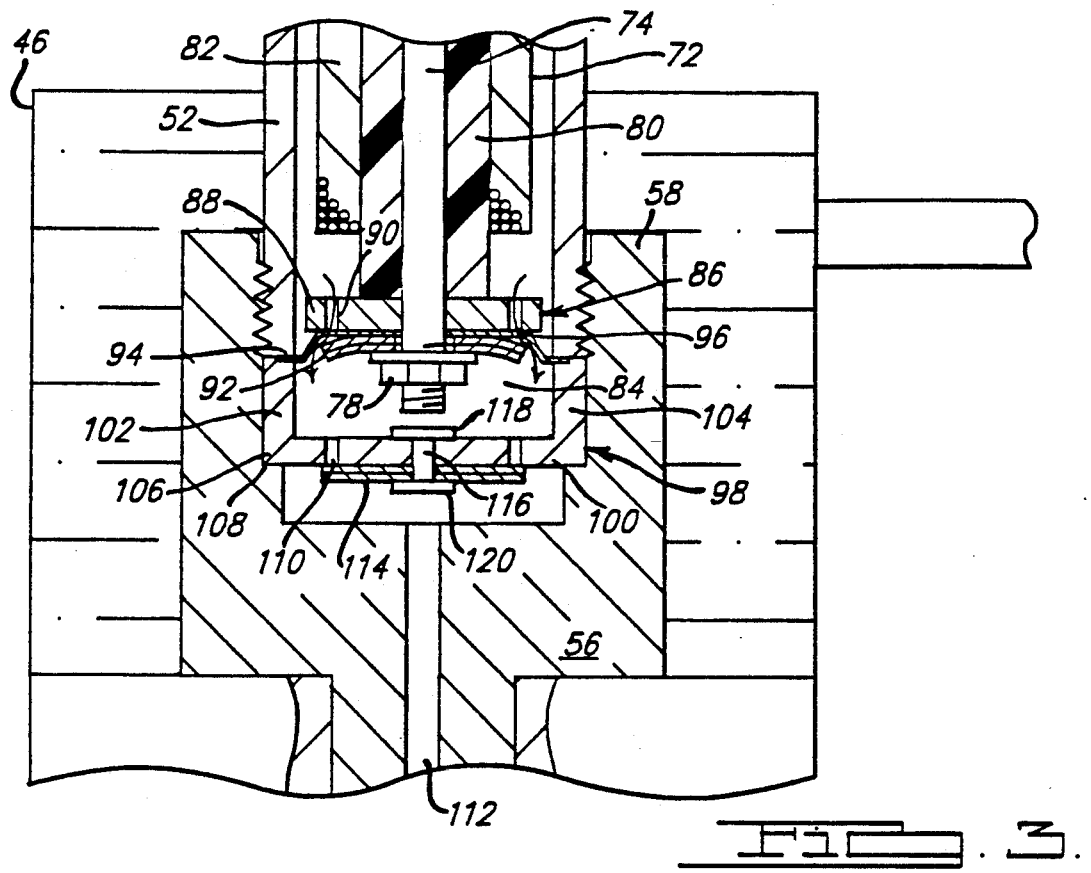
FIG. 3 is an enlarged view of the hydraulic actuator for use in the leveling system shown in FIG. 2 during one portion portion of the pumping cycle.
Figure 4:
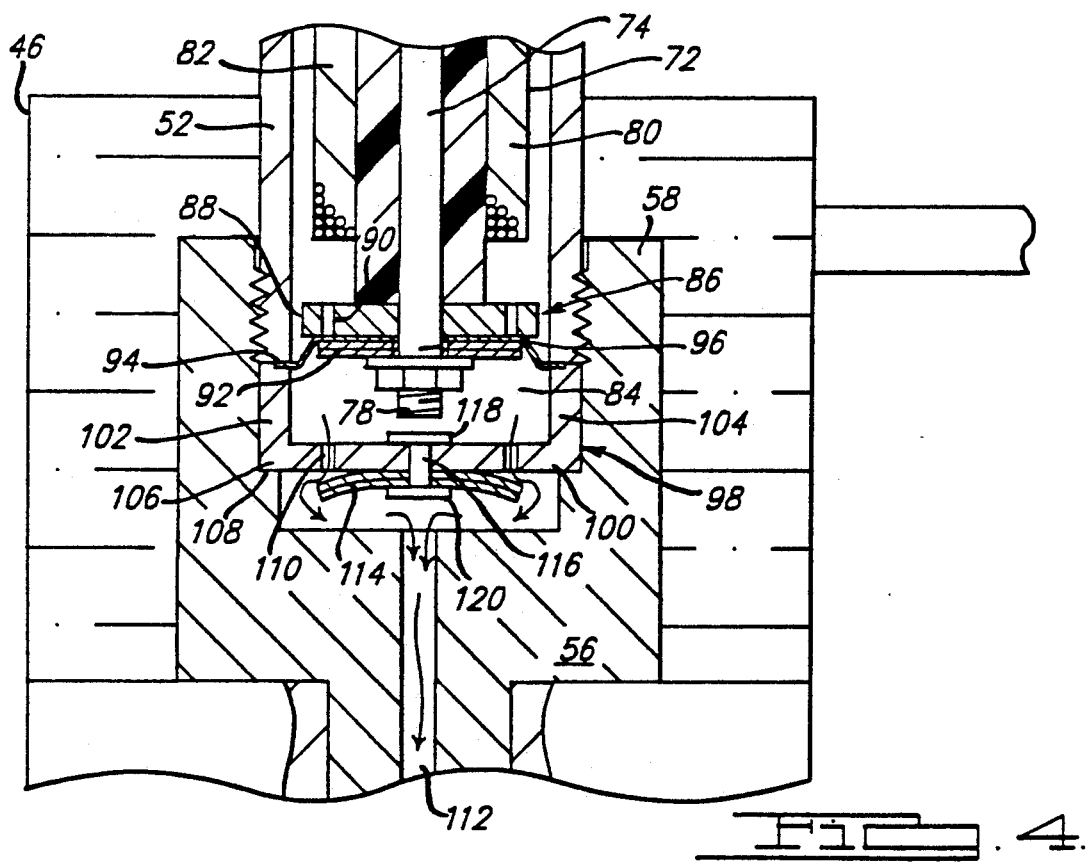
FIG. 4 is an enlarged view of the hydraulic actuator for the leveling system shown in FIG. 3 during a different portion of the pumping cycle.

During the second portion of the pump cycle as shown in FIG. 3, the current delivered to the coil 82 is terminated which causes the strength of the electromagnetic field induced in the magnetostrictive sleeve 80 to decline. This reduction in the electromagnetic field causes the magnetostrictive sleeve 80 to contract. By contracting the magnetostrictive sleeve 80, the longitudinal pump member 72 also contracts thereby causing the first valve member 86 to move in an upward direction. This upward movement of the first valve member 86 causes damping fluid to flow from the region in the piston rod 52 between the inner surface of the piston rod 52 and the external surface of the coil 82 (i.e., the damping fluid which originates from the reservoir tank 44) to flow through the first plurality of flow passages 90 and into the intermediate chamber 84. This occurs because the first plurality of disk members 92 bend in a downward direction thereby allowing relatively unobstructed flow through the first plurality of flow passages 90 as well as the apertures 96 in the membrane 94.

After the second portion of the pumping cycle is completed, the first portion of the pumping cycle is again executed in which current again is delivered to the coil 82 which causes an electromagnetic field to be induced in the magnetostrictive sleeve 80 thereby causing the magnetostrictive 80 to expand. This expansion of the magnetostrictive sleeve 80 again causes damping fluid to flow from the intermediate chamber 84 into the lower portion of the working chamber 48. The second portion of the pumping cycle is then executed which causes damping fluid to flow from the reserve tank 44 to the intermediate chamber 84. This process continues until sufficient damping fluid has been delivered to the lower portion of the working chamber to achieve the desired amount of leveling. One method for determining the amount of leveling required by a suspension system under varying ride characteristics is described in Lizell, M., "Dynamic Leveling for Ground Vehicles", Doctorial Thesis, Royal Institute of Technology, Stockholm, Sweden.

It will be apparent that the preferred embodiment illustrated herein is well calculated to fulfill the objects stated above, it will be appreciated that the invention is susceptible to modification, variation and change without departing from the scope of the invention. For example, other flow passages may be present in the piston post so as to allow damping fluid to flow into the upper portion of the working chamber. In addition, the first valve member may be of other types which do not require a membrane for functioning. Finally, the reservoir tank and accumulator may be of other construction without departing from the scope of the present invention.

What is claimed is:

1. A hydraulic actuator fluidly communicating with a reservoir, said hydraulic actuator comprising:

a pressure cylinder forming a working chamber having first and second portions operable to store damping fluid;

a piston disposed within the pressure cylinder between said first and second portions of said working chamber;

a piston rod for supporting said piston in said pressure cylinder; and pump means for pumping damping fluid from said reservoir to said working chamber, said pump means being at least partially disposed within said hydraulic actuator and including a coil being operable to receive current.

2. The hydraulic actuator according to claim 1, wherein said pump means comprises a first valve means for permitting damping fluid to flow from said reservoir into an intermediate chamber disposed within said hydraulic actuator.

3. The hydraulic actuator according to claim 2, wherein said pump means comprises a second valve means for permitting damping fluid to flow from said intermediate chamber to said working chamber.

4. the hydraulic actuator according to claim 1, wherein said pump means is disposed entirely within said hydraulic actuator.

5. The hydraulic actuator according to claim 1, wherein said pump means comprises:

a first check valve fluidly communicating with damping fluid in said reservoir;

a first flow passage disposed within said first check valve for permitting damping fluid to flow from said reservoir to an intermediate chamber;

a second check valve fluidly communicating with damping fluid in said intermediate chamber; and a second flow passage disposed within said second check valve for permitting damping fluid to flow from said intermediate chamber to said working chamber.

6. The hydraulic actuator according to claim 5, wherein said pump means comprises a longitudinal support rod at least partially disposed within said piston rod, said longitudinal support rod being operable to support said first check valve in said piston rod.

7. The hydraulic actuator according to claim 6, wherein said longitudinal support rod is operable to elongate so as to cause damping fluid in said intermediate chamber to flow into said working chamber.

8. The hydraulic actuator according to claim 6, wherein said pump means includes a magnetostrictive sleeve surrounding said longitudinal support rod, elongation of said magnetostrictive sleeve being operable to cause elongation of said longitudinal support rod.

9. The hydraulic actuator according to claim 8, wherein current flowing through said coil is operable to cause the length of said magnetostrictive sleeve to change.

10. A hydraulic actuator fluidly communicating with a hydraulic actuator, said hydraulic actuator comprising:

a pressure cylinder forming a working chamber having first and second portions operable to store damping fluid;

a piston disposed within the pressure cylinder between said first and second portions of said working chamber;

a piston rod for supporting said piston in said pressure cylinder;

first valve means for controlling the flow of damping fluid from said reservoir to an intermediate chamber disposed within said hydraulic actuator;

second valve means for controlling the flow of damping fluid from said intermediate chamber to said working chamber; and means for delivering damping fluid from said reservoir to first valve means, said means for delivering damping fluid from said reservoir to said first valve means includes a coil disposed within said hydraulic actuator being operable to receive electric current.

11. The hydraulic actuator according to claim 10, wherein said means for delivering damping fluid from said reservoir to said first valve means includes a longitudinal support rod disposed within said piston rod, said longitudinal support rod being operable to support said first valve means in said piston rod.

12. The hydraulic actuator according to claim 11, wherein said longitudinal support rod is operable to elongate so as to cause damping fluid in said intermediate chamber to flow into said working chamber.

13. The hydraulic actuator according to claim 12, wherein said means for delivering damping fluid from said reservoir to said first valve means further comprises a magnetostrictive sleeve surrounding said longitudinal support rod, elongation of said magnetostrictive sleeve being operable to cause elongation of said longitudinal support rod.

14. The hydraulic actuator according to claim 13, wherein current flowing through said coil is operable to cause the length of said magnetostrictive sleeve to change.

15. The hydraulic actuator according to claim 14, wherein said first valve means comprises a first plate member having a first plurality of flow passages disposed therein, said first plurality of flow passages allowing fluid communication between said reservoir and said intermediate chamber.

16. The hydraulic actuator according to claim 15, wherein said first valve means further comprises a membrane disposed on said first plate member, said membrane being operable to cause the pressure of the damping fluid in said intermediate chamber to increase upon elongation of said longitudinal support rod.

17. The hydraulic actuator according to claim 16, wherein said first valve means further comprises a first disk member operable to bias a portion of said membrane against said first plate member.

18. The hydraulic actuator according to claim 17, wherein at least a portion of said membrane is secured to said piston rod.

19. The hydraulic actuator according to claim 18, wherein said second valve means comprises a second plate member having a second plurality of flow passages disposed therein, said second plurality of flow passage being operable to allow fluid communication between said intermediate chamber and said working chamber.

20. The hydraulic actuator according to claim 19, wherein said second valve means comprises a second disk member operable to allow damping fluid to flow from said intermediate chamber to said working chamber when pressure of the damping fluid in said intermediate chamber exceeds the pressure of the damping fluid in said working chamber by a predetermined value, said second disk means being able to prevent the flow of damping fluid from said working chamber to said intermediate chamber through said second plurality of flow passages.

21. A method for changing the height of a hydraulic actuator having a pressure cylinder forming a working chamber with first and second portions, said method comprising the steps of:

moving a pump member in a first direction so as to cause damping fluid from a reservoir to flow into an intermediate chamber, said pump member being at least partially disposed within said hydraulic actuator; and moving said pump member in a second direction so as to cause damping fluid in said intermediate chamber to flow into said working chamber, said step of moving said pump member in said second direction includes the step of delivering current to a coil disposed within said hydraulic actuator.

22. The method of claim 21, wherein said step of delivering current to a coil includes the step of causing said expansion of said pump member.

23. The method of claim 22, wherein said step of moving a pump member in a first direction includes the step of terminating the delivery of current to said coil.

24. The method of claim 23, wherein said step of moving a pump member in a first direction includes the step of causing contraction of said pump member.

25. The method according to claim 21, wherein said pump member comprises first valve means for controlling the flow of damping fluid from said reservoir to an intermediate chamber disposed within said hydraulic actuator, said hydraulic actuator further comprising second valve means for controlling the flow of damping fluid from said intermediate chamber to said working chamber, said step of moving a pump member in a first direction comprises the step of moving said first valve member in a direction away from said second valve member thereby causing damping fluid from said reservoir to enter said intermediate chamber.

26. The method of claim 25, wherein said step of moving said pump member in a second direction comprises the step of moving said first valve member in a direction toward said second valve member so as to cause damping fluid from said intermediate chamber to flow into said working chamber.

27. The method of claim 21, wherein said hydraulic actuator further comprises a magnetostrictive element, said step of moving a pump member in a first direction comprises the step of causing said magnetostrictive element to contract.

28. The method of claim 27, wherein said step of moving said pump member in a second direction comprises the step of causing said magnetostrictive element to elongate.

29. A method for changing the length of a hydraulic actuator, said hydraulic actuator being fluidly connected to a reservoir of damping fluid and comprising:

(a) a pressure cylinder forming a working chamber having first and second portions operable to store damping fluid;

(b) a piston disposed within the pressure cylinder between said first and second portions of said working chamber;

(c) a piston rod for supporting said piston in said pressure cylinder;

(d) first valve means for controlling the flow of damping fluid from said reservoir to an intermediate chamber;

(e) second valve means for controlling the flow of damping fluid from said intermediate chamber to said working chamber; and (f) a longitudinal pump member at least partially disposed within said piston rod;

said method comprising the steps of:

delivering damping fluid from said reservoir to said first valve means;

moving said first valve means in a direction away from said second valve means so as to cause damping fluid from said reservoir to flow through said first valve means into said intermediate chamber; and moving said second valve means in a direction toward said second valve means so as to cause damping fluid in said intermediate chamber to flow through said second valve means into said working chamber.

30. The method according to claim 29, wherein said first valve means comprises:

(a) a first plate member having a first plurality of flow passages disposed therein, and (b) means for permitting unidirectional flow of damping fluid through said first plurality of flow passages, said step of moving said first valve means in a direction away from said second valve means includes the step of permitting damping fluid to flow through said first plurality of flow passages, said step of moving said first valve means in a direction toward said second valve means includes the step of preventing the flow of damping fluid through said first plurality of flow passages by said means for permitting unidirectional flow of damping through said first plurality of flow passages.

31. The method according to claim 30, wherein said means for permitting unidirectional flow of damping fluid through said first plurality of flow passages comprises a membrane and a first disk member operable to bias said membrane against said first plate member, said step of moving said first valve means in a direction away from said second valve means includes the step of allowing damping fluid to flow from said reservoir to flow to said intermediate chamber through apertures in said membrane, said step of moving said first valve means in a direction toward said second valve means includes the step of causing said disk member to obstruct the flow of damping fluid through the apertures in said membrane.

32. The method according to claim 31, wherein said second valve means includes:

(a) a second plate member having a second plurality of flow passages disposed therein, and (b) a second disk member permitting unidirectional flow through said second plate member;

said step of moving said first valve means in a direction away from said second valve means includes the step of allowing said second disk member to obstruct the flow of damping fluid through said second plate member, said step of moving said first valve means in a direction toward said second valve means includes the step of causing the damping fluid in said second plurality of flow passages to exert a biasing source on second disk member so as to allow damping fluid to flow through said second plurality of flow passages.

* * * * *

UNITED STATES PATENT AND TRADEMARK OFFICE
CERTIFICATE OF CORRECTION

PATENT NO. : 5,163,659
DATED : November 17, 1992
INVENTOR(S) : Magnus B. Lizell

It is certified that error appears in the above-identified patent and that said Letters Patent is hereby corrected as shown below:

Column 8, line 23, Claim 4, "the" should be --The--.

Column 8, line 59, Claim 10, "hydraulic actuator" should be --reservoir--.

Column 9, line 67, Claim 20, "second disk means" should be --second disk member--.

Column 11, line 14, Claim 29, "second valve" should be --first valve--.

Column 12, line 30, Claim 32, "biasing source" should be --biasing force--.

Column 12, line 30, Claim 32, before "second disk" insert --said--.

Signed and Sealed this

Thirteenth Day of December, 1994

Attest:

BRUCE LEHMAN

Attesting Officer

Commissioner of Patents and Trademarks